Feb. 5, 1924.                                                1,482,913
J. H. CLARK ET AL
TRACTOR WHEEL
Filed April 20, 1921
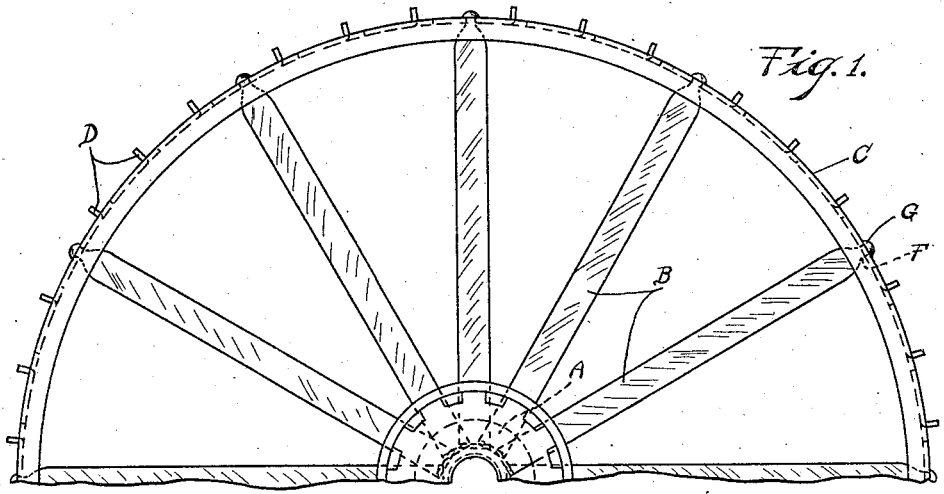
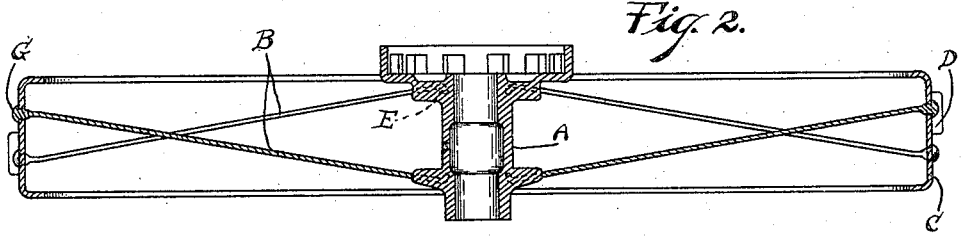
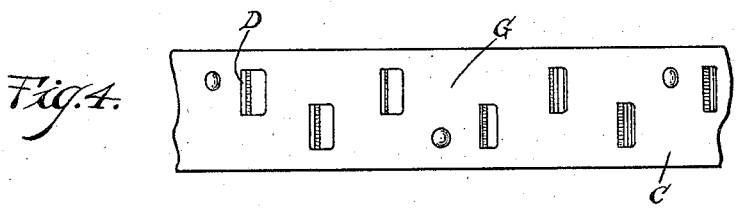
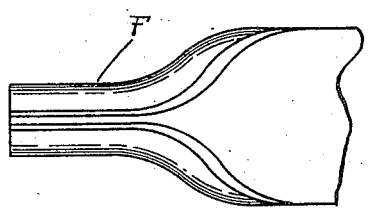
Inventors
James Harry Clark
Thomas C. Whitehead
By Whittemore Hulbert Whittemore
+Belknap         Attorneys Patented Feb. 5, 1924.

1,482,913

UNITED STATES PATENT OFFICE.

JAMES HARRY CLARK AND THOMAS C. WHITEHEAD, OF DETROIT, MICHIGAN.

TRACTOR WHEEL.

Application filed April 20, 1921. Serial No. 463,026.

*To all whom it may concern:*

Be it known that we, JAMES HARRY CLARK and THOMAS C. WHITEHEAD, both citizens of the United States of America, residing at Detroit, in the county of Wayne and State of Michigan, have invented certain new and useful Improvements in Tractor Wheels, of which the following is a specification, reference being had therein to the accompanying drawings.

This invention relates to vehicle wheels and consists in the structural features and arrangement of parts hereinafter fully disclosed.

In the drawings:

Figure 1 is a view of the improved wheel in side elevation;

Figure 2 is a diametrical sectional view of the same;

Figure 3 is a detail view of one of the outer spoke extremities;

Figure 4 is an exterior view of a portion of the rim of the wheel.

In these views the reference characters A, B and C respectively designate the hub, spokes and rim of a vehicle wheel. The rim C is provided with a plurality of transverse cleats D having the nature of tongues struck out of said rim and bent radially outward. Preferably said cleats are alternately staggered as is best indicated in Figure 4. The spokes B are formed by two sets of wide, thin metal bars, having their inner ends cast into the hub A, said ends being preferably bent, as indicated at E, to increase the retention. It is preferred to incline the spokes transversely of the wheel and to reverse the inclinations of alternate spokes, so that the alternate spokes cross each other intermediate the hub and rim as is best seen in Figure 2. Thus one or other of the two sets of oppositely inclined spokes will be tensioned to prevent distortion of the wheel as the result of end thrust in either direction. The outer end portions of the spokes are rolled to a tubular form as indicated at F, said portions being passed through suitable openings in the rim C and being swaged to form rivet heads upon the outer face of said rim as indicated at G.

The described construction establishes a very strong rigid connection between the rim, spokes and hub; the material used and the process of manufacture and assembly being comparatively inexpensive.

The advantages of applicants' construction are:—First, it is very simple; second by forming the outer end of the spoke into a tubular portion applicant, after riveting, acquires a greater locking surface on the rim periphery than would be obtainable if the end were made into a solid portion; and third it is easy to manufacture as applicant merely bends the metal around thereby reducing the cost to a minimum. The wide flat rear end portion of the spoke, which is slightly hooked makes for a greater retaining surface in the hub.

What we claim as our invention is:

1. A vehicle wheel comprising a hub, a rim and spokes formed by flat metal bars having tubular outer ends engaging openings in the rim.

2. A vehicle wheel comprising a hub, a rim and spokes formed of bar metal, tubularly fashioned at their outer ends and engaged in openings in the rim and upset to form heads upon the exterior face of the rim.

3. A vehicle wheel comprising a hub, a rim and spokes formed of bar metal cast into said hub at their inner ends and tubularly fashioned at their outer ends to engage openings in the rim.

4. A vehicle wheel comprising a hub, a rim and spokes formed of bar metal cast into said hub at their inner ends and tubularly fashioned at their outer ends to engage openings in the rim and upset to form heads upon the exterior face of the rim.

5. A vehicle wheel comprising a hub, a rim and spokes formed of wide metal bars slightly curved at their inner ends and cast into said hub, and tubularly fashioned at their outer end to engage openings in the rim and upset to form heads upon the exterior face of the rim.

In testimony whereof we affix our signatures.

JAMES HARRY CLARK.
THOMAS C. WHITEHEAD.